June 29, 1971  I. W. HARDY  3,589,991
TITANIUM DIOXIDE RECOVERY
Filed Sept. 18, 1967  2 Sheets-Sheet 1

INVENTOR.
IRVIN W. HARDY
BY  John W. Whisler
ATTORNEY

June 29, 1971     I. W. HARDY     3,589,991
TITANIUM DIOXIDE RECOVERY

Filed Sept. 18, 1967     2 Sheets-Sheet 2

INVENTOR.
IRVIN W. HARDY

BY John W. Whisler

ATTORNEY 3,589,991
TITANIUM DIOXIDE RECOVERY
Irvin W. Hardy, Pensacola, Fla., assignor to
Monsanto Company, St. Louis, Mo.
Filed Sept. 18, 1967, Ser. No. 668,523
Int. Cl. B01k 5/00, 5/02; C23b 13/00
U.S. Cl. 204—180R                 2 Claims

ABSTRACT OF THE DISCLOSURE

Titanium dioxide is recovered from an aqueous titanium dioxide slurry by applying an electric field between two electrodes immersed in the slurry thereby causing migration of suspended titanium dioxide particles to one of the electrodes and deposition of these particles onto that electrode in the form of a coating which is subsequently recovered.

BACKGROUND OF THE INVENTION

In carrying out industrial processes occasions arise where for one reason or another conventional techniques of recovering suspended material from a suspension thereof are not satisfactory. Such occasions arise, for example, in the manufacture of synthetic fiber-forming polyamides, e.g., nylon-66, where titanium dioxide in aqueous suspension is metered from holding tanks into the manufacturing process as a delusterant. Substantial amounts of undispersed titanium dioxide settle and accumulate in the bottom of these tanks and will eventually be metered to the manufacturing process if not removed therefrom. Undispersed titanium dioxide in the delusterant is undesirable since it would adversely effect the properties and quality of the ultimate product. Although titanium dioxide recovered from the bottom of the tanks cannot be used to prepare additional delusterant suspension because of inherent contamination resulting from recovery, it can be used in other industrial processes, for example, in the treating of wood pulp, where a high degree of purity is not necessary. Recovery of the titanium dioxide from the tanks presents a problem for the reason that, although water can be easily introduced into the tanks and suspensions formed, titanium dioxide cannot be easily isolated therefrom according to conventional techniques; filtration is unsatisfactory due to the physical properties of the suspended titanium dioxide particles; centrifuging is costly and requires a large process area for its application.

Heretofore, solid titanium dioxide has been recovered from the aqueous pasty mass remaining in the tanks by drying the mass with, for example, a rack of heating lamps and then scooping or shoveling the titanium dioxide from the tanks into containers. This technique however is commercially unattractive because the drying equipment is expensive and costly to operate. Moreover, while the drying equipment is in use the tanks must be taken out of service.

The present invention provides a simple and economical means of recovering suspended particles from suspensions, and particularly, titanium dioxide from aqueous suspensions thereof.

SUMMARY OF THE INVENTION

It has now been discovered that suspended particles can be recovered from a liquid suspension thereof by the process of the present invention which process comprises:

(1) Charging said particles with an effective electric charge and charging said liquid with a corresponding electric charge of opposite sign;

(2) Applying a direct current electric field between two electrodes immersed in said suspension whereby said particles deposit onto one of the electrodes; and (3) Recovering the said particles from the electrode.

As used herein, the term "suspension" and "slurry" have reference to finely-divided particles floating or dispersed in a liquid.

The principles involved in the process of the present invention are believed to be similar to those of electrophoresis. Extensive literature has been published on electrophoresis and, although there are no unified theories describing the electrophoretic deposition of the particles onto the electrode, it is agreed that in order to secure migration of the suspended particles under the influence of an electric field, the particles must carry an effective electric charge and the liquid a charge of the opposite sign to preserve electrical neutrality. In the absence of electrical neutrality an electric field cannot be established between the electrodes. The literature indicates that this charge on the suspended particles is generally attributed to the sorption of ions or ionizable substances such as dispersing agents which are used to prepare the stable suspensions. For example, it is known that in preparing dispersions of titanium dioxide it is desirable that some polar constituent, e.g., a polyphosphate, be present in the dispersing medium to cause the particles which are strongly hydrophilic to be deflocculated in the medium. Polyphosphates, e.g., tetrasodium pyrophosphate, cause deflocculation with respect to titanium dioxide particles and are known for their ability to suspend inorganic materials in aqueous medium. Apparently, as a result of the sorption of the phosphate molecules onto the surface of the particles, there is a large increase in surface potential of each particle; when all the particles bear strong charges of the same sign, they repel each other and hence are deflocculated. The polyphosphates belong to the general class of compounds referred to as surface active agents. In practicing the invention any suitable surface active agent may be used for purposes of charging the suspended particles with the effective electric charge and its selection will be readily apparent after consideration of the suspension involved with reference to the particles and dispersing medium. The ions of the surface active agents not carried by the particles are thought to be carried by the dispersing medium and are, of course, opposite in sign thereto, thus, preserving electrical neutrality.

The amount of surface active agent required to effectively charge the particles with the effective electric charge or to form a stable suspension is small and varies from 0 to 5% by weight of the suspension although higher concentrations may be used. Usually, the amount will be from 0.05% to 0.5% by weight. Accordingly, depending upon the dispersing agent or other surface active agent selected and suspension conditions, such as pH, the particles may carry either a positive or negative charge; upon applying a current between the electrodes, the charged particles migrate to the cathode or anode, respectively. It is thought that the charged particles are neutralized at the electrode at the time the particles deposit thereon.

A suitable direct current source is a dry cell battery, preferably a multi-tap dry cell battery and adapted so that the voltage can be varied and controlled from 0–90 volts or more. Preferably, however the amperage of the current should not exceed about 35 amperes since at higher amperage power costs tend to reduce the commercial desirability of the process.

In carrying out the process of the present invention a practioneer may experiment to determine precisely optimum conditions for recovering a particular suspended material from a given suspending liquid.

In its simplest application the present invention may be carried out in, for example, a beaker containing a slurry by merely applying a direct current electric field between two electrodes of a dry cell battery immersed in the slurry possessing electrical neutrality; discontinuing the field; removing the electrode containing the deposit; allowing the deposit to dry; and then removing the solid deposit from the electrode.

The operation of the invention is described by reference to the accompanying drawings which show a preferred embodiment of the invention.

DESCRIPTION OF THE PREFERRED EMBODIMENT

Figure 1:
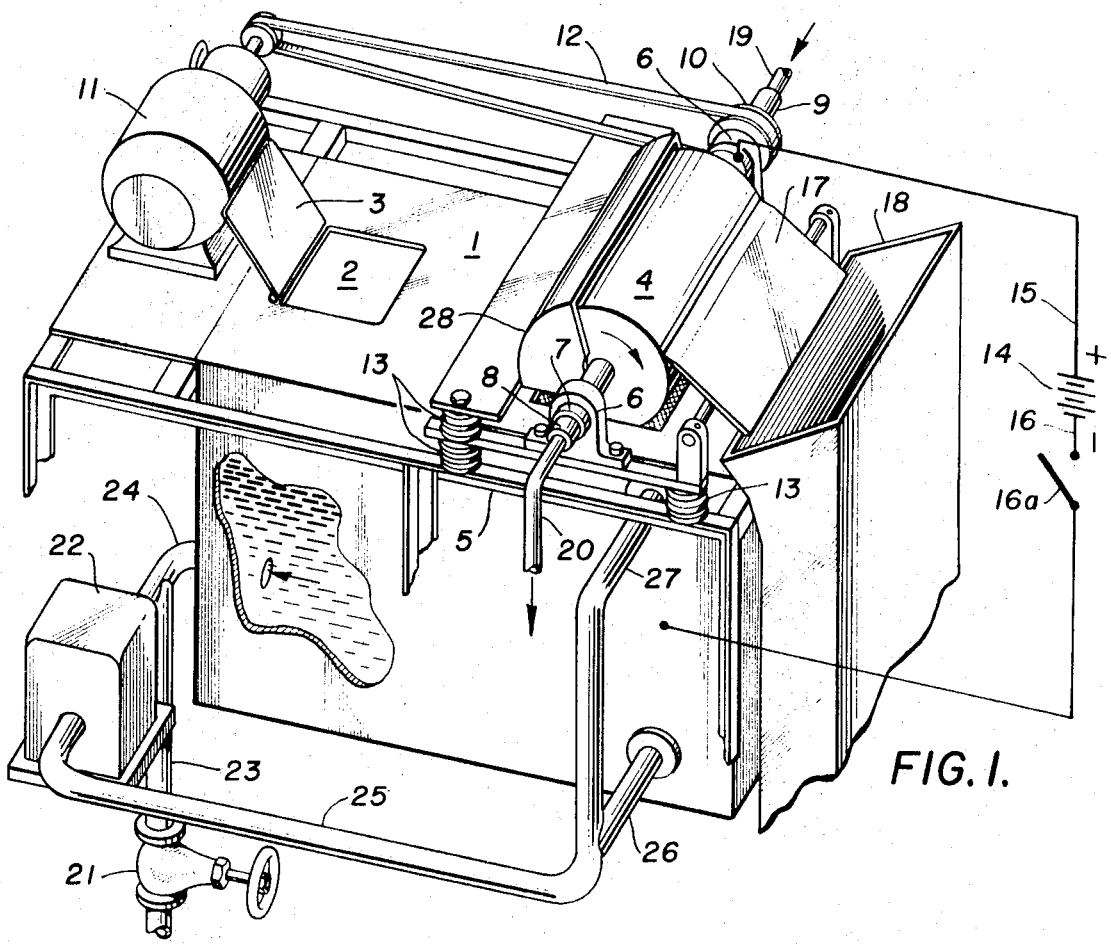
FIG. 1 is a perspective view of an apparatus according to the invention.
Figure 2:
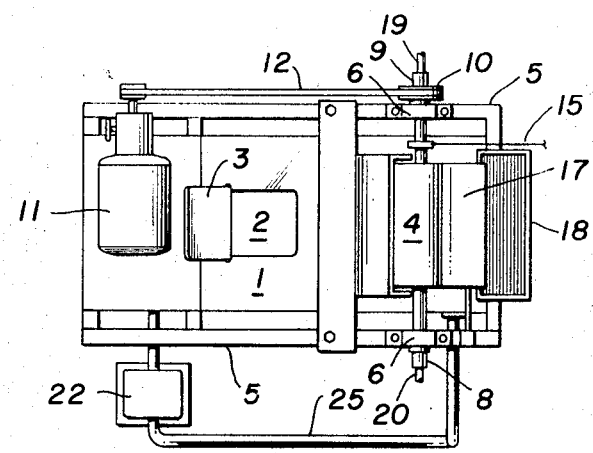
FIG. 2 is a plan view of FIG. 1 with parts removed.
Figure 3:
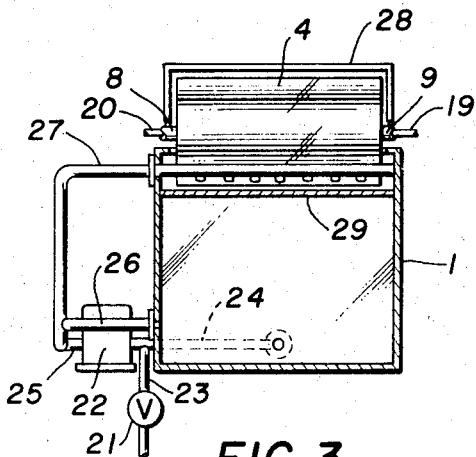
FIG. 3 is a frontal elevation view of FIG. 1 with parts removed.
Figure 4:
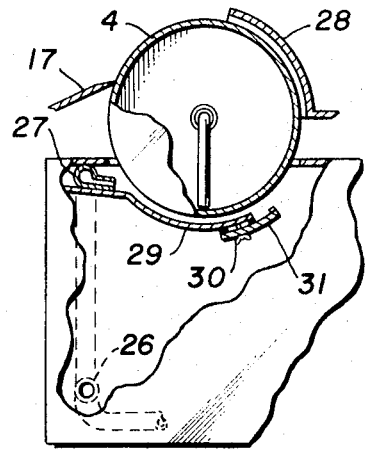
FIG. 4 is a side elevation of FIG. 1 with parts removed and a portion thereof having parts broken away.
Figure 5:
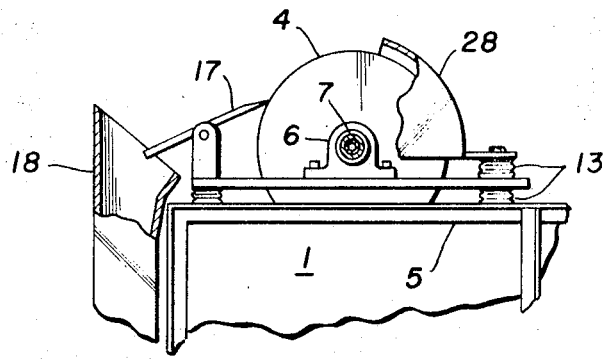
FIG. 5 is a side elevation of FIG. 1 with parts removed.

The apparatus comprises reservoir 1 for receiving and containing slurry. Reservoir 1 has opening 2 in the top thereof with hinged door 3 adapted to expose and cover said opening. The opening is used to observe operating conditions within the reservoir. Hollow cylinder 4 is rotatably and horizontally mounted on frame 5 by means of mount 6 having journal bearing 7 adapted to receive hollow shafts 8 and 9 of cylinder 4. An opening in the top surface of reservoir 1 receives the lower portion of cylinder 4; cylinder 4 however is not in actual contact with reservoir 1. Cylinder 4 is rotated by disc 10 driven by variable speed motor 11 via endless belt 12 and is electrically insulated from frame 5 by insulating means 13. Thus, cylinder 4 is at all times electrically insulated from reservoir 1. Positive terminal of dry cell battery 14 is connected to cylinder 4 via lead 15; the negative terminal of battery 14 is connected to reservoir 1 via lead 16. In the drawings cylinder 4 is the cathode while reservoir 1 is the anode. Obviously the cylinder could be the anode and the reservoir the cathode merely by reversing the terminals. Lead 16 includes switch 16a to conveniently establish and discontinue the electric field between cylinder 4 and reservoir 1. Scraper means 17, also electrically insulated from reservoir 1 and frame 5, is provided to remove material from the surface of cylinder 4 through chute 18 into a suitable container not shown. Scraper means 17 is preferably a series of blades spaced a small distance from cylinder 4 so that when the cylinder is heated contact is not made between scraper means 17 and cylinder 4. Steam is passed into hollow cylinder 4 via inlet steam line 19 which extends into hollow shaft 9; condensation and steam are removed from cylinder 4 via outlet line 20 which extends through hollow shaft 8 into cylinder 4.

In using the apparatus valve 21 is opened and slurry enters centrifugal pump 22 via lines 23 and 24, and is forced into reservoir 1 via lines 25, 26 and 27. The slurry is agitated by continually passing a portion thereof from reservoir 1 through pump 22 and back to reservoir 1. Slurry enters reservoir 1 via line 26 located near the bottom thereof and via line 27 located near the top thereof. Slurry entering line 27 flows into pan 29 spaced a distance from the lower portion of cylinder 4; pan 29 has a shape corresponding to the contour of cylinder 4. In carrying out the invention the surface of cylinder 4 is always in contact with slurry in pan 29. When pump 22 is operating, the volume of slurry flowing into pan 29 is greater than its capacity thereby causing slurry to overflow from pan 29 into slurry contained at the bottom of the reservoir. The volume of slurry in the bottom of reservoir 1 is not critical so long as outlet line 24 is immersed therein. The depth of slurry in pan 29 and accordingly the surface of cylinder 4 immersed in slurry can be adjusted by adjusting means 30 which extends or withdraws member 31 which may be considered an extension of pan 29. When the electric field is applied between cylinder 4 and reservoir 1 suspended material in the slurry migrates to cylinder 4, assuming the particles are negatively charged, and forms a deposition thereon. The speed at which the cylinder rotates may be adjusted so that the time required for the deposition on the cylinder to travel from the slurry to scraper means 17 is sufficient for the deposition to dry.

Operation of the foregoing apparatus is illustrated in the following example.

EXAMPLE

The apparatus of FIG. 1 was used under the following conditions:

| | |
|---|---|
| Slurry | Aqueous titanium dioxide slurry having a solids content of 58–59% by weight based on weight of total slurry. The titanium dioxide particles had an average particle size of about 136 millimicrons. |
| Dispersing agent | 0.20% wt. based on weight of slurry. |
| Circumference of cylinder | 59.22 in. (diameter 18 in.). |
| R.p.m. of cylinder | 2. |
| Voltage applied | 20 volts. |
| Amperage applied | 29 amperes. |
| Surface of cylinder immersed in slurry | 360 sq. in. |
| pH of slurry | 9.1. |
| Amount of slurry in reservoir | 20.2 gal. (254.1 lbs.). |
| Time apparatus was operated | 15 min. |

Under the above conditions 39.2 pounds of titanium dioxide were recovered which corresponds to a recovery rate of 156.8 lbs. per hour. The average size of the recovered titanium dioxide particles was 112 millimicrons.

The example illustrates that suspended material can be conveniently and continuously recovered from a liquid suspension thereof with an apparatus requiring little space and supervision.

Thus far the process and apparatus of the present invention has found its most useful application in recovering titanium dioxide from holding tanks which are used in supplying titanium dioxide slurry to nylon-66 processes where the titanium dioxide is incorporated into the product as a delusterant. The titanium dioxide particles which are commercially available are usually coated with a material, for example, epoxides; alkyl silicates; metal oxides, e.g. aluminum, titanium, zirconium, molybdenum cerium, etc.; sodium silicate, trimethylolpropane; magnesium hydroxide; manganese sulfate and phosphoric acid. These coatings however do not adversely effect the recovery process of the present invention. In fact, the presence of these coatings may even aid in providing the effective electric charge to the suspended titanium dioxide particles either by providing the charge per se or cooperating in some manner with the dispersing agent in providing the charge.

In the process according to the present invention the rate of deposition of suspended particles onto an electrode (cylinder) generally varies in the following manner: (1) increases with increase in voltage applied to the electric field; the strength of the current passing between the electrodes is measured in amperes which is directly proportional to voltage when the resistance is constant; (2) increases as the solid content of the slurry increases; (3) varies with the pH of the slurry, e.g., with an aqueous titanium dioxide slurry (30% solid content) using tetrasodium pyrophosphate as the dispersing agent, the rate of recovery will double when the pH is changed from 9.4 to 7.0; a further reduction to pH 6.3 not only increases the rate of deposition but results in a change in the consistence of the slurry to that of thick viscous paint; (4)

increases with a decrease in the rotation rate of the cylinder which controls the contact time of deposition surface with slurry, and (5) increases with increase in surface area of electrode (cylinder) in contact with slurry. These five parameters or variables can easily be optimized for any given slurry and apparatus involved.

In recovering titanium dioxide from an aqueous slurry thereof the solid content of the slurry is preferably in the range of from about 30% to 70% by weight although recovery can be effected from slurries of lesser or greater solid content. The pH should be from about 6.0 to 10.0 and preferably between 6.5 and 9.5.

Although the present invention has been described with particular reference to recovering titanium dioxide from aqueous slurries thereof, it is equally applicable to other slurries wherein electrical neutrality can be established. Other materials, for example, which may be recovered from slurry according to the invention include silicon carbide; iron oxide, boron, dysprosium, gold, niobium, tungsten, diamond powder, chromium oxide, rhenium, zirconium hydride, thorium, neptunium carbide, plutonium carbide, tantalum oxide, high polymers, etc.

Additionally, the process and apparatus of the present invention can be used to effectively separate and recover the liquid from a liquid suspension. In this application, after the suspended material had been removed from the liquid suspension, the liquid could then easily be decanted, drained or recovered by any other convenient means.

What is claimed is:

1. A process for continuously recovering titanium dioxide particles from an aqueous suspension thereof having a solid content of between about 30% and 70% by weight which comprises:
    (A) containing said suspension within a suitable apparatus;
    (B) adding to said suspension from about 0.05 to 0.5% by weight, based on the weight of the suspension, of a polyphosphate to impart to said particles a negative charge and a corresponding positive charge to the liquid;
    (C) adjusting the pH of said suspension between about 6 and 10;
    (D) applying a direct current electrical field between an anode immersed in said suspension and a rotatable, horizontally-positioned cathode partially immersed in said suspension, whereby said particles migrate to and deposit onto the immersed surface of said cathode;
    (E) rotating said cathode about its horizontal axis, whereby during one rotation thereof all portions of the curved surface of said cathode are in contact with said suspension part of the time and out of contact therewith the remainder of the time; and
    (F) removing said particles from said cathode and said particles are out of contact with said suspension.

2. The process according to claim 1 wherein the electric charge is imparted to said material and said liquid by adding tetrasodium pyrophosphate to the suspension.

References Cited

UNITED STATES PATENTS

| | | | |
|---|---|---|---|
| 1,435,886 | 11/1922 | Acton et al. | 204—180 |
| 1,719,984 | 7/1929 | Klein et al. | 204—300X |
| 1,750,177 | 3/1930 | Klein | 204—300X |
| 2,478,322 | 8/1949 | Robinson et al. | 304—181 |
| 2,485,335 | 10/1949 | Tyson | 204—180 |
| 2,900,320 | 8/1959 | Metcalfe et al. | 204—300 |
| 2,944,952 | 7/1960 | McMinn, Jr. | 204—180 |
| 3,436,326 | 4/1969 | Stober | 204—180 |

TA-HSUNG TUNG, Primary Examiner

A. C. PRESCOTT, Assistant Examiner

U.S. Cl. X.R.

204—181